United States Patent [19]

Deval et al.

[11] Patent Number: 5,020,370
[45] Date of Patent: Jun. 4, 1991

[54] VIBRATING BEAM FORCE-FREQUENCY TRANSDUCER AND PENDULOUS ACCELERATOR COMPRISING APPLICATION THEREOF

[75] Inventors: Alain Deval, Courbevoie; Yvon Amand, Soisy Sous Montmorency, both of France

[73] Assignee: Societe D'Applications Generales D'Electricite et de Mecanique Sagem, Paris, France

[21] Appl. No.: 422,170

[22] Filed: Nov. 28, 1989

[30] Foreign Application Priority Data

Dec. 2, 1988 [FR] France .................................. 8815835

[51] Int. Cl.⁵ ............................ G01L 1/10; G01L 1/26
[52] U.S. Cl. ................................. 73/517 AV; 73/778;
73/862.54; 310/346; 310/338; 310/321
[58] Field of Search ............. 73/517 AV, 778, 862.59,
73/DIG. 1, DIG. 4, 497; 310/315, 346, 338,
315, 321

[56] References Cited

U.S. PATENT DOCUMENTS 3,268,789  8/1966  Pintell ................................. 318/314
4,215,570  8/1980  Eer Nisse ......................... 73/862.59
4,479,385  10/1984  Koehler ............................. 73/517 R
4,594,898  6/1986  Kirkman .......................... 73/862.59

FOREIGN PATENT DOCUMENTS 0284440  10/1988  Japan .................................. 73/862.59

Primary Examiner—Hezron E. Williams
Assistant Examiner—Craig Miller
Attorney, Agent, or Firm—Larson and Taylor

[57] ABSTRACT

A vibrating force transducer suitable for use in a pendular accelerometer comprises a flat elongated strip of piezo-electric material having end portions arranged for being securely connected to elements which apply a force to be measured along the direction of elongation when the transducer is in service. The strip is fractionated by slits parallel along the direction of elongation and orthogonal to major faces of the strips into a central beam and lateral beams which are in a common plane, the lateral beams carrying electrode means for flexural vibration in the common plane at a resonance frequency indicative of the value of the force applied to the end portions and the central beam carrying a resistive temperature sensor.

7 Claims, 3 Drawing Sheets

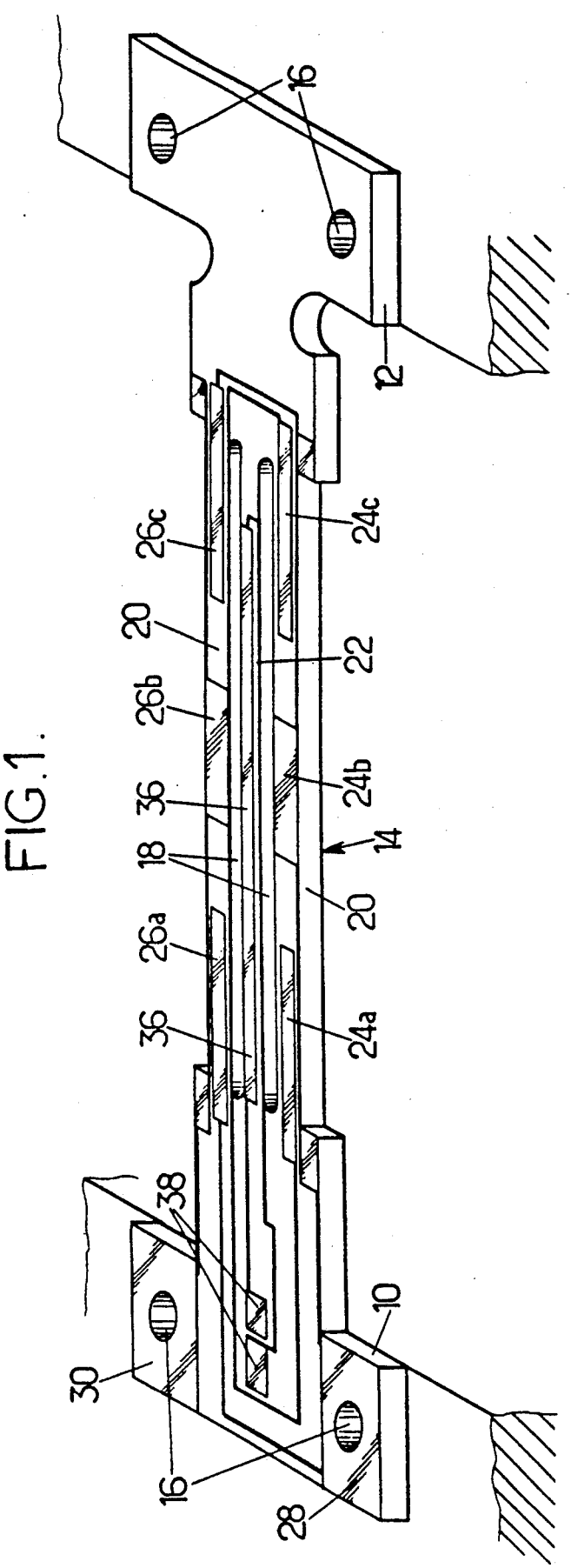

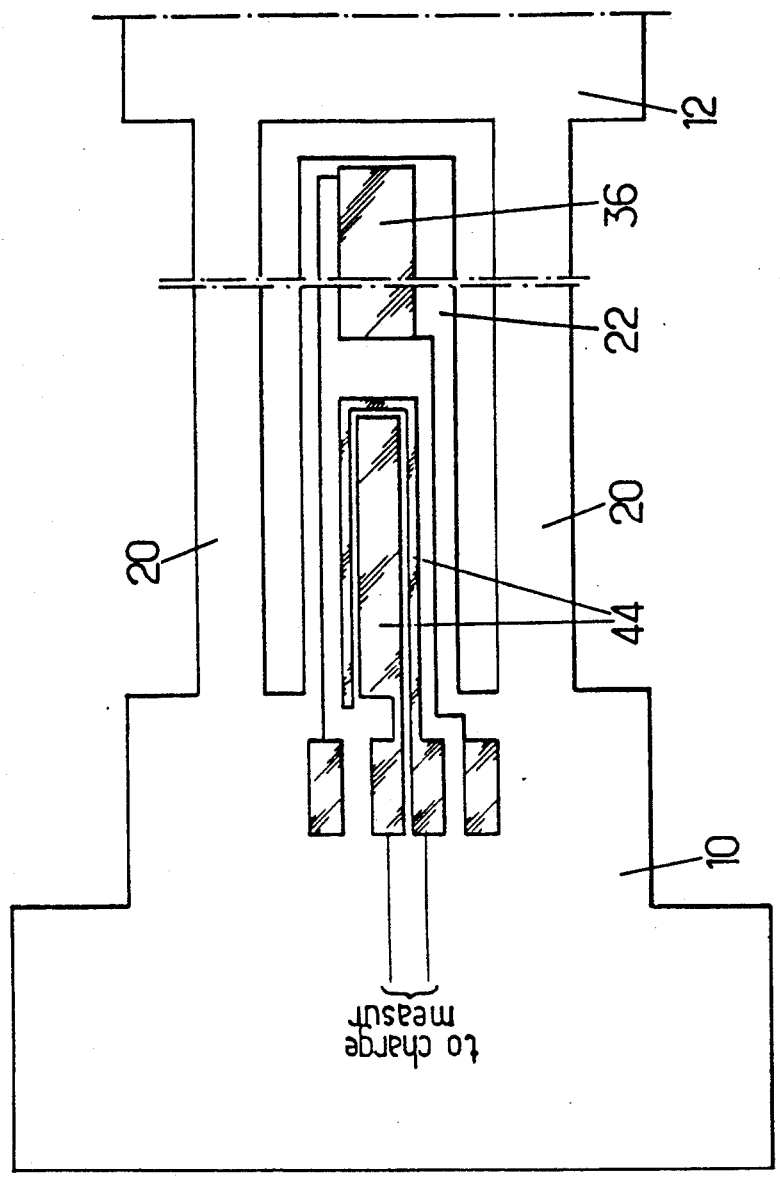

VIBRATING BEAM FORCE-FREQUENCY TRANSDUCER AND PENDULOUS ACCELERATOR COMPRISING APPLICATION THEREOF

BACKGROUND OF THE INVENTION

1. Technical Field

The invention relates to vibrating beam force-frequency transducers which make it possible to obtain force measuring apparatuses having a small mass and volume. It relates more precisely to transducers of the type comprising an elongate strip of piezo-electric material embedded at both its ends in elements applying a longitudinal force to the strip and split in its middle portion so as to form two lateral beams carrying electrodes for vibrating the beams in the plane of the major faces of the strip and for measuring the vibration frequency.

With such a transducer, the tractive force applied to the ends of the strip may be measured. It finds a particularly important, although not exclusive, application in non-servoed pendulous accelerometers comprising a pendular seismic mass or proof mass connected to a base by an articulation allowing it to move in a sense direction perpendicular to the articulation axis. The ends of the transducer are then secured to the base and to the mass.

2. Prior Art

Numerous transducers of the above-defined type are already known. Examples are given in U.S. Pat. No. 3,238,789 (Erdley) and French 2,454,614 (U.S. Department of Energy). According to the latter document, it would be essential that the distance separating the two beams be very small and form a slit whose width is less than the thickness of the beam. The reason alleged for this condition is that the slit must be narrow for the forces applied to the two beams to be equal and for the Q factor to be high and to give an acceptable stability.

Even if transducers of the above-defined type may effectively be produced having a very small mass and volume and an acceptable sensitivity, they have drawbacks. The main one is that their force-frequency response varies as a function of the temperature. For a known type transducer which may be considered as typical, the scale factor (frequency variation when under an acceleration equal to $g=9.81$ ms$^{-2}$) ranges from 0.5 to a few Herz. Now, for an operating temperature of 70° C., which value is usual in numerous inertial equipments, the parabolic frequency variation is $7.5.10^{-2}$ Hz per °C.: a difference as small as 0.1° C. between the two strips of the sensor results in an error of $7.5.10^{-2}$ g on the acceleration, which is high as compared with the sensitivity.

SUMMARY OF THE INVENTION

An object of the invention is to provide an improved transducer of the above-defined type. It is a more specific object to provide a transducer enabling an accurate and reliable temperature correction, taking into account the actual temperature of the transducer and so insensitive to the temperature deviations which may exist between the transducer and its environment.

For this, the invention provides a transducer comprising a central beam carrying a resistive temperature sensor, which central beam is separated from the lateral beams by longitudinal slits perpendicular to the major surfaces of the strip. Since the whole strip is at the same temperature, the knowledge of the temperature of the central beam makes it possible, from a previously stored calibration curve, to achieve an exact correction. This correction may be made not only in a sensor comprising a single transducer but also in a sensor comprising two transducers associated in a differential circuit, the correction then taking into account the difference between the temperatures of the two transducers.

In a first embodiment, the central beam is connected to both ends of the strip. Contrary to the teaching of French 2,454,614, the presence of the central beam only reduces the sensitivity of the transducer by a factor equal to the ratio between the cross-section of the lateral vibrating beams and the sum of the cross-sections of these beams and of the central beam: this factor may be kept at a value close to 1, for example about ¾. As a counterpart of this reduction in sensitivity, the resistance to breakage of the transducer and so its possible operating range is increased in a ratio which is inverse of the preceding factor, namely 4/3.

In another embodiment, the central beam is separated from one of the ends of the strip; then there is no reduction of sensitivity and, contrary to what might be believed from reading French No. 2,454,614, separation of the lateral beams by the central beam results neither in reduction of the Q factor, nor in imbalance between the forces applied to the lateral beams.

The use of a central beam separated from one of the ends further enables (on condition that this beam is provided with electrodes for measuring the amplitudes of the vibrations under flexion) to balance the vibratory movements of the two lateral beams. In fact, the central beam embedded at one end is subjected to flexure forces at the operating frequency of the transducer, with an amplitude which is an increasing function of the imbalance of the vibratory movements of the two lateral beams. Such imbalance, which reduces the maximum Q factor, is due for example to dimensional differences of the two lateral beams. By vaporizing a small mass on one of the beams, for example using a laser, the imbalance can be reduced to a practically zero value, detected by the absence of vibrations induced in the median beam.

SHORT DESCRIPTION OF THE DRAWINGS

The invention will be better understood from the following description of particular embodiments, given by way of non-limitative examples. The description refers to the accompanying drawings, in which:

FIG. 1 is a perspective view of a transducer according to a particular embodiment of the invention, the scale not being respected for greater clarity;

Figure 2:
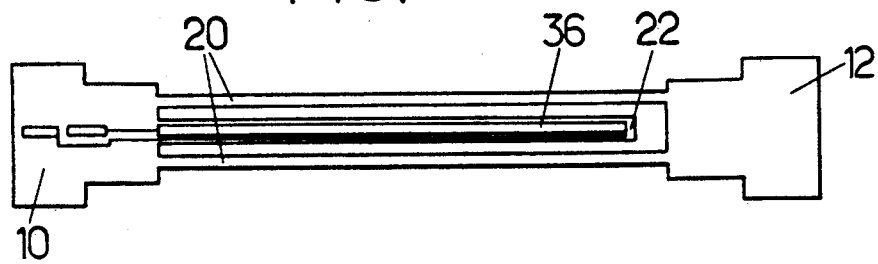
FIG. 2 is a schematic top view of the transducer forming a modification of that of FIG. 1.
Figure 3:
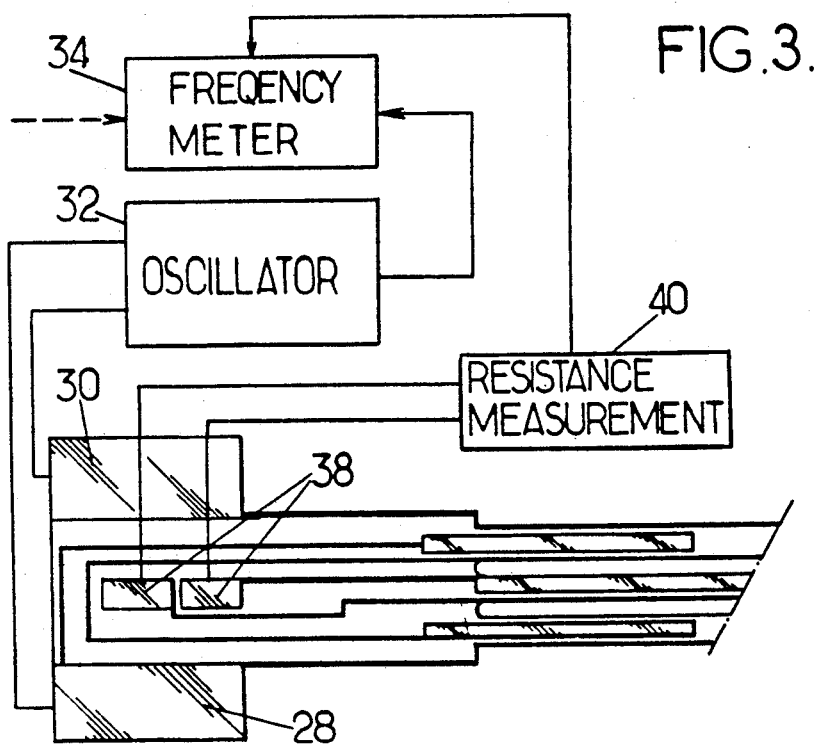
Figure 4:
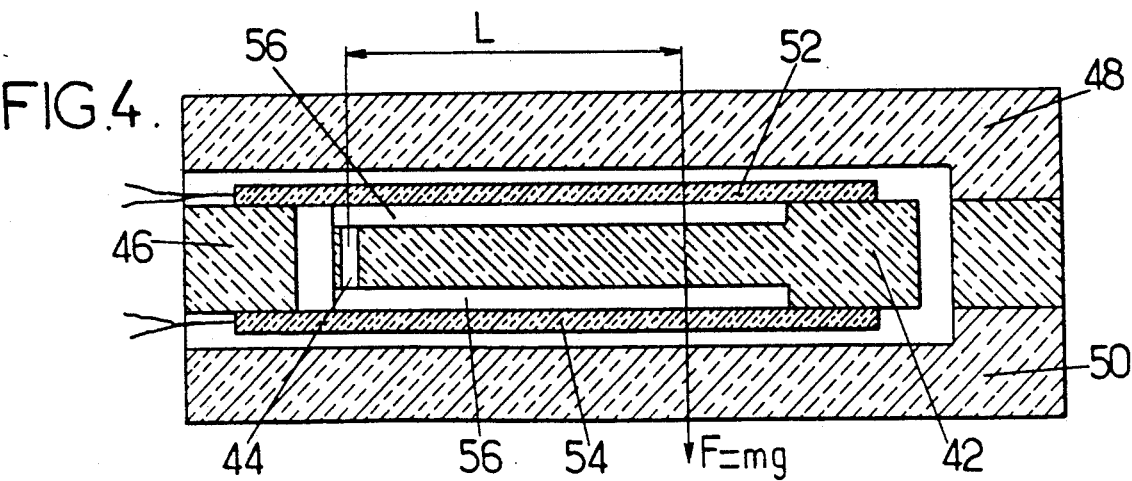

FIG. 2A, similar to part of FIG. 2, illustrates a possible location of electrodes for measuring the vibrations of the central beam;

FIG. 3 is a simplified diagram of an electric measuring circuit which may be associated with the transducer of FIG. 1;

FIG. 4 shows, in cross-section, an accelerometer using two transducers in accordance with the invention.

DETAILED DESCRIPTION OF PREFERRED EMBODIMENTS

The transducer shown schematically in FIG. 1 is formed as a monolithic strip forming a resonator, made from piezo-electric material, generally quartz. The strip may be regarded as comprising two end portions 10 and 12 intended to be fixed to mechanical non-vibrating elements applying a longitudinal force to the strip and an elongate active portion 14. As a general rule, the end portions will be fixed by connections comparable to embedments: the flat end portions may for example be forcibly applied to corresponding faces of the force application elements by means of screws passing through holes 16.

The strip is always very thin: its thickness is about one tenth of a millimeter and its width is often greater then the thickness by an order of magnitude.

Two parallel longitudinal slits 18 formed in the active portion 14 split the latter into two lateral beams 20, disposed symmetrically each on one side of the mid plane of the strip and a central beam 22. The strip may be cut out from a flat quartz sheet and the slits 18 may be cut using a photolitographic process, which is well known and makes batch manufacture possible. Very thin slits 18 may be formed using photolithography, having a thickness generally less than one tenth of a millimeter. These slits extend over a large fraction of the length of the active portion 14. As illustrated in Figure they end at a distance from the rigid connection. Often, a ratio between the length of slits 18 and the length between embedments between 0.4 and 0.7 gives good results. The ratio between the width of the lateral beams and the thickness of the strip is generally between 1 and 2.4.

The lateral beams carry electrodes for causing them to vibrate in the plane of the strip and for measuring the vibration frequency. It is in particular possible, by way of example, to provide on the lower face of the beams a metal layer connected to ground and, on the upper face, a set of electrodes having the construction shown schematically in FIG. 1. These electrodes are divided into two groups, respectively 24a, 26b and 24c; and 26a, 24b and 26c. The electrodes of a same group are connected together and are connected to a connection zone 28 or 30 formed at one of the ends 10. In a modified construction, the lower face of the beams carries a set of electrodes identical to that of the uper face, the electrodes again being supplied through metal paths on the sides of the beams. As shown in FIG. 3, zones 28 and 30 are connected to the outputs of an oscillator 32 which is tuned to the natural frequency of the strip, measured with a frequency meter 34. A differential circuit is generally used comprising two transducers of the kind shown in FIG. 1 or 3; the frequency meter 34 measures, by beating between two electric signals, the difference between the frequencies of two identical transducers one of which is subjected to the force to be measured and the other (whose output is shown by a broken line arrow in FIG. 3) is subjected to no force or to an equal force but opposite in direction.

The central beam 22 carries a temperature measurement resistance probe 36. This probe may be formed by a thin layer, about 1 μm thick, of platinum on an underlayer formed for example by a chromium film 100 Å thick. Such a probe has a resistance which vary substantially linearly responsive to temperature. The ends of probe 36, in the form of an elongate band, are connected by conducting tracks to zones 38 for the connection of connecting conductors to a resistance (and consequently temperature) measuring circuit 40 (FIG. 3).

The output signal from circuit 40 may be applied to the frequency measurement circuit 34, which then comprises a correction table as a function of the temperature for giving a corrective indication of the tractive or compression force applied to the transducer.

In a case of a differential sensor, having two transducers, the temperature measuring circuit 40 may be provided for measuring the temperature difference between the two transducers rather than the absolute temperature thereof.

In the modification of the invention shown in FIG. 2, the central beam 22 is separated from end portion 12. The transducer of FIG. 2 may be identical to that of FIG. 1, except insofar as this separation is concerned, and may then be manufactured with simply a very slight modification of the photolitographic mask. Thus, using the same manufacturing method, either the transducer shown in FIG. 1 may be obtained when a high degree of mechanical resistance is desired or the one shown in FIG. 3 when maximum sensitivity is desired.

The embodiment shown in FIG. 2 further makes it possible to balance the vibratory movements of the beams 20: the central beam 22, embedded at one end and placed between two vibrating beams, is subjected to flexure forces at the frequency of oscillator 32, with an amplitude related to the degree of imbalance of the vibratory movements of beams 20. The amplitude of this movement may be detected with additional electrodes 41 placed on the central beam 22 (FIG. 2A). Beams 20 may then be balanced by partially vaporizing deposits previously provided on beams 20. An extra-thickness of gold may in particular be provided on electrodes 24b and 26b and vaporize small masses out of the deposits with laser pulses until the imbalance is reduced to zero. Thus a maximum Q factor may be obtained by balancing.

The transducer which has just been described has numerous applications. FIG. 4 shows by way of example an accelerometer using two transducers in accordance with the invention, mounted differentially so that one of the transducers is subjected to a compression force when the other is subjected to a tractive force, which eliminates some errors.

The accelerometer shown in FIG. 4 comprises a seismic mass 42 connected by an articulation 44 defining an articulation axis to a base 46. The base belongs to a frame completely surrounding the mass and arranged to be placed between two flanges 48 and 50 to form an accelerometric cell which may be sealed. When subjected to an acceleration g, the seismic mass is subjected to a torque, with respect to the hinge, equal to mgL (FIG. 4).

The sensor is formed by two transducers 52 and 54 straddling the seismic mass 42 in the direction of the sensitive axis, shown by the arrow F. Each transducer has an end fixed flat on base 46 and another end fixed flat on mass 42. Recesses 56 formed in the mass, by etching for example, allow the beams of the transducers to vibrate without hindering.

We claim:

1. A vibrating force transducer comprising a flat elongated strip of piezo-electric material having end portions arranged for being securely connected to elements which apply a force to be measured along the direction of elongation when the transducer is in service, said strip being fractionated by slits parallel along the direction of elongation and orthogonal to major faces of said strips into a central beam and lateral beams which are in a common plane, said lateral beams carrying electrode means for flexural vibration in said common plane at a resonance frequency indicative of the value of the force applied to said end portions and said central beam carrying a resistive temperature sensor.

2. Transducer according to claim 1, wherein said central beam is connected to both end portions of the strip.

3. Transducer according to claim 1, wherein said central beam is separated from one of the end portions of the strip.

4. Transducer according to claim 1, wherein the central beam further carries electrode means for measuring the amplitude of flexure vibrations of said central beam.

5. Transducer according to claim 1, wherein said resistive temperature sensor comprises a metal track having a thickness much lower than the thickness of the strip, deposited on one of the major faces of the central beam.

6. Transducer according to claim 5, wherein end portions of said track are connected by electrically conducting paths to enlarged zones for connection to a temperature measurement circuit.

7. In a pendular accelerometer comprising a pendular mass, connected to a base through articulation means for pendular movement about an articulation axis in the direction of a sense axis and at least one force transducer, said transducer comprising a flat elongated strip of piezo-electric material having end portions which are securely connected to said pendular mass and to said base, respectively for being subjected to a force along the direction of elongation when said accelerometer is subjected to an acceleration directed along the sense axis, said strip being fractionated by slits parallel along the direction of elongation and orthogonal to major faces of said strips into a central beam and lateral beams which are in a common plane, said lateral beams carrying electrode means for flexural vibration in said common plane at a resonance frequency indicative of the value of the force applied to said end portions and said central beam carrying a resistive temperature sensor.

* * * * *